(12) United States Patent
Eichendorf et al.

(10) Patent No.: US 6,279,873 B1
(45) Date of Patent: Aug. 28, 2001

(54) FUEL INJECTION VALVE

(75) Inventors: Andreas Eichendorf, Schorndorf; Thomas Sebastian, Stuttgart; Guido Pilgram, Schwieberdingen; Rainer Norgauer, Ludwigsburg, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/445,627
(22) PCT Filed: Apr. 7, 1999
(86) PCT No.: PCT/DE99/01040
§ 371 Date: Dec. 9, 1999
§ 102(e) Date: Dec. 9, 1999
(87) PCT Pub. No.: WO99/53189
PCT Pub. Date: Oct. 21, 1999

(30) Foreign Application Priority Data

Apr. 11, 1998 (DE) .............................. 198 16 315

(51) Int. Cl.$^7$ .................................. F02M 51/06
(52) U.S. Cl. ................. 251/129.19; 251/129.21
(58) Field of Search ........... 251/129.19, 129.21, 251/77

(56) References Cited

U.S. PATENT DOCUMENTS

| | | | | |
|---|---|---|---|---|
| 3,100,103 | * | 8/1963 | Bullard | 251/30.03 |
| 3,342,451 | * | 9/1967 | Matousek | 251/77 |
| 3,737,141 | * | 6/1973 | Zeuner | 251/129.19 X |
| 3,970,282 | * | 7/1976 | Hansen | 251/129.19 X |
| 4,008,876 | * | 2/1977 | Bastle | 251/129.19 |
| 4,027,850 | * | 6/1977 | Allen | 251/129.19 |
| 4,392,634 | * | 7/1983 | Kita | 251/129.19 |
| 4,526,340 | * | 7/1985 | Kolchinsky et al. | 251/77 X |
| 4,592,533 | * | 6/1986 | Guglielmi et al. | 251/77 X |
| 4,765,587 | * | 8/1988 | Cummins | 251/129.19 |
| 4,898,434 | * | 2/1990 | Kohno et al. | 251/129.19 X |
| 5,029,807 | * | 7/1991 | Fuchs | 251/129.19 X |
| 5,118,076 | * | 6/1992 | Homes | 251/129.19 X |
| 5,145,146 | * | 9/1992 | Matsushima | 251/129.19 X |
| 5,261,610 | * | 11/1993 | Waryu et al. | 251/129.19 X |
| 5,299,776 | | 4/1994 | Brinn, Jr. et al. | . |
| 5,639,061 | * | 6/1997 | Krauter et al. | 251/77 |
| 5,820,101 | * | 10/1998 | Ricco | 251/129.19 X |

FOREIGN PATENT DOCUMENTS

| | | |
|---|---|---|
| 33 14 899 | 10/1984 | (DE) . |
| 0 404 336 | 12/1990 | (EP) . |
| 93 00540 | 1/1993 | (WO) . |

* cited by examiner

*Primary Examiner*—Joseph A. Kaufman
*Assistant Examiner*—John Bastianelli
(74) *Attorney, Agent, or Firm*—Kenyon & Kenyon

(57) ABSTRACT

A fuel injection valve for a fuel injection system of an internal combustion engine, in particular for injecting fuel directly into the combustion chamber of the internal combustion engine. The fuel injection valve has a magnet coil, an armature that can be pulled by the magnet coil in a direction of lift against a first return spring, and a valve needle. The valve needle has a first stop surface for the armature, which can be moved relative to the valve needle. The armature is acted upon by a second return spring. In addition, a stationary second stop surface for the armature is provided. The second return spring acts upon the armature in a direction opposite to the lift and in an inoperative position, when the magnet coil is not energized, and holds the armature in contact with the second stop surface so that a distance between the armature and the first stop surface provided on the valve needle is predefined.

11 Claims, 3 Drawing Sheets

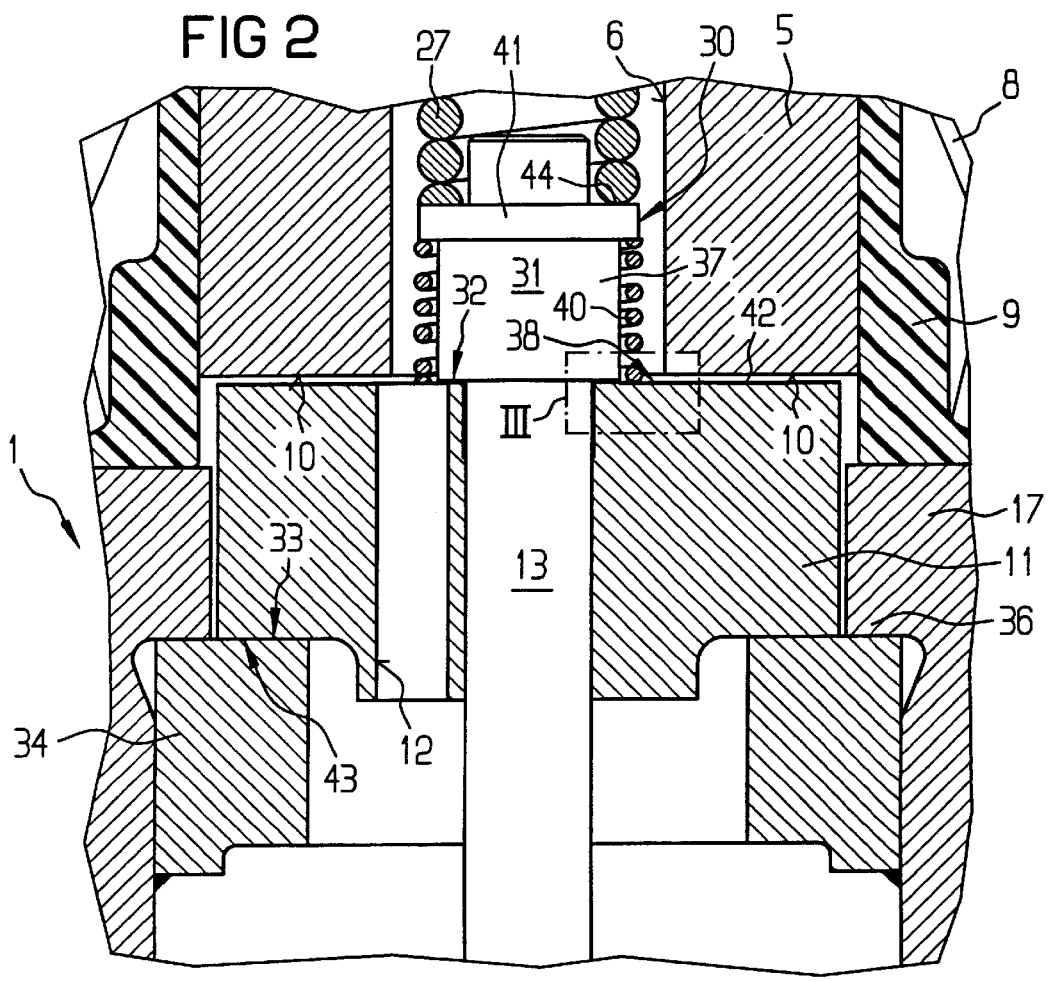
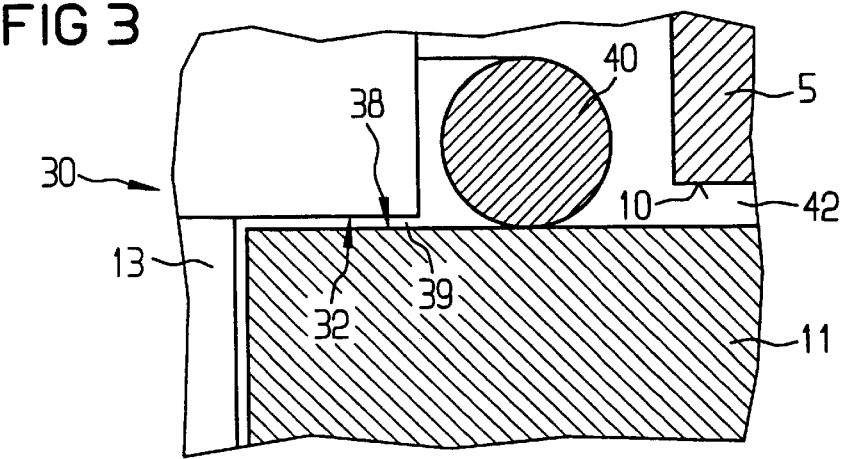

FUEL INJECTION VALVE

FIELD OF THE INVENTION

The present invention relates to a fuel injection valve.

BACKGROUND INFORMATION

A fuel injection valve that can be actuated electromagnetically, wherein an armature works in conjunction with a magnet coil that can be electrically energized so as to cause electromagnetic actuation, and the lift of the armature is transferred to a valve closing element via a valve needle, is described in German Published Patent Application No. 33 14 899. The valve closing element interacts with a valve seat. The armature is not rigidly attached to the valve needle, but rather is arranged so that it can be moved axially relative to the valve needle. A first return spring acts upon the valve needle in the direction of closing and therefore keeps the fuel injection valve closed when no current is being applied to the magnet coil and the magnet coil is thus in its nonenergized state. A second return spring acts upon the armature in the direction of lift in such a way that in its inoperative position the armature is in contact with a first stop surface arranged on the valve needle. When the magnet coil is energized, the armature is pulled in the direction of lift and carries the valve needle with it via the first stop surface. When the current energizing the magnet coil is turned off, the valve needle is accelerated into its closed position by the first return spring and carries the armature with it via the aforementioned stop surface. As soon as the valve closing element impacts the valve seat, the needle valve's closing movement ends abruptly. The armature, which is not rigidly attached to the valve needle, continues to move in the direction opposite to the lift, and this movement is absorbed by the second return spring, i.e., the armature pushes against the second return spring, which has a significantly smaller spring constant than the first return spring. The second return spring once again accelerates the armature in the direction of lift. If the armature impacts the stop surface of the valve needle, the valve closing element, which is attached to the valve needle, is lifted off the valve seat again for a short time and thus opens the fuel injection valve for a short time. Thus the impact dampening described in German Published Patent Application No. 33 14 899 is incomplete. In addition, the disadvantage of a conventional fuel injection valve in which the armature is rigidly attached to the valve needle, and of the fuel injection valve described in German Published Patent Application No. 33 14 899, is that the opening lift of the valve needle takes effect as soon as the magnetic force applied to the armature by the magnet coil exceeds the sum of the forces in the direction of closing, i.e., the closing force of the spring and the hydraulic forces of the fuel, which is under pressure. This is a disadvantage in that when the current energizing the magnet coil is turned on the magnetic force does not immediately reach its final value due to the self-induction of the magnet coil and the eddy currents that arise. The valve needle and the valve closing element are therefore accelerated by a reduced force when the opening lift begins. As a result, the opening time is unsatisfactory for certain applications.

In this connection, U.S. Pat. No. 5,299,776 proposes that the armature not be rigidly attached to the valve needle but rather that a certain amount of axial motion tolerance between the armature and the valve needle be provided. However, in this fuel injection valve, the axial position of the armature in the inoperative position is not defined, and thus with the fuel injection valve described in this patent the response time when the energizing current is turned on is undefined.

SUMMARY OF THE INVENTION

By contrast, the fuel injection valve according to the present invention has the advantage that the fuel injection valve is impact dampened in a satisfactory manner, and in addition the opening time is extremely short.

Because, when the fuel injection valve is in the inoperative position, the second return spring holds the armature in contact not with the first stop surface arranged on the valve needle but rather with a second stationary stop surface located at a distance from the valve needle's first stop surface, the armature is not accelerated again in the direction of lift by the second return spring when the fuel injection valve closes. When the fuel injection valve closes, initially the valve needle stops moving abruptly when the valve closing element comes into contact with the valve seat when accelerated by the first return spring. The armature continues moving in the direction of closing, i.e., in the direction opposite to the direction of lift, in the fuel injection valve according to the present invention too, until it reaches the second stop surface. If the armature bounces back from the second stop surface, it is accelerated again in the direction opposite to the lift by the second return spring, and this keeps the armature from reaching the valve needle's first stop surface and thereby carrying the valve needle with it in the direction of opening. The second return spring ensures that a distance is maintained between the armature and the first stop surface arranged on the valve needle until the armature is once again accelerated in the direction of lift by the magnet coil when the next current pulse is applied to energize the magnet coil.

A further advantage of the fuel injection valve according to the present invention is that the armature is first preaccelerated before it reaches the first stop surface provided on the valve needle, i.e., before it carries the valve needle with it. As a result the armature achieves impetus before it carries the valve needle with it, and transfers it to the valve needle. By contrast with a fuel injection valve in which the armature is rigidly attached to the valve needle or one in which the armature is movable relative to the valve needle but is in contact with the valve needle's stop surface when in the inoperative position, the valve according to the present invention ensures that the opening time is considerably shorter, which means the fuel can be metered more precisely. As a result of a further effect that shortens the opening time, initially a reduced magnetic force is applied to the armature when the current pulse that energizes the magnet coil is turned on, due to the self-induction of the magnet coil and the eddy currents created by the magnet coil. Provided suitable distance is chosen between the second stop surface on which the armature rests in the inoperative position and the first stop surface that ensures that the armature carries the valve needle with it, when the armature impacts the valve needle's first stop surface so much time has elapsed that the magnetic force has reached its final constant value. As a result of the armature's preassigned "flight time," a delay may be achieved that significantly shortens the fuel injection valve's subsequent opening time.

Preferably a flange, preferably in the shape of a stepped cylinder, is provided on the valve needle. The flange and the valve needle may be a single piece, e.g., this may be achieved via pressure forming. Alternatively, the flange may be a separate component attached to the valve needle via welding, soldering or a similar method. If the flange is designed as a stepped cylinder, preferably a first shoulder serves as the first stop surface for the armature, while the second spring rests against a second shoulder of the stepped cylinder. The first return spring may rest against a face of the stepped cylinder that faces away from the second return spring. Thus the flange in the form of a stepped cylinder simultaneously fulfils several of the key functions of the present invention.

The second stop surface and a face of the armature opposite the second stop surface are preferably flat. The space between the armature and the second stop surface is preferably connected to a fuel channel through which the fuel is conveyed from a fuel intake nozzle to the valve closing element. When the armature is lifted off the second stop surface, the space between the armature and the second stop surface fills up with fuel. Thus when the fuel injection valve closes, a pressure flow is set up between the second stop surface and the armature as the space diminishes due to the armature's closing movement. As a result of the pressure flow, dampening occurs, so that the armature comes to rest on the second stop surface with virtually no bounce.

The second return spring may also be integrated into a ring-shaped recess in the armature. Herein, the ring-shaped recess may be located on the side of the armature opposite to the first stop surface if the second return spring is pretensioned in the direction of traction. As a result an especially compact design is achieved.

The distance between the armature and the first stop surface is preferably dimensioned so that during the "flight time" required by the armature to reach the first stop surface when the magnet coil is energized an essentially constant magnetic force applied to the armature by the magnet coil is generated. This ensures the fuel injection valve's opening time is especially short.

BRIEF DESCRIPTION OF THE DRAWINGS

FIG. 2 shows a partial cross-sectional view of a first embodiment of a fuel injection valve according to the present invention.

FIG. 3 shows an enlarged view of Detail III shown in FIG. 2.

DETAILED DESCRIPTION

Figure 4:
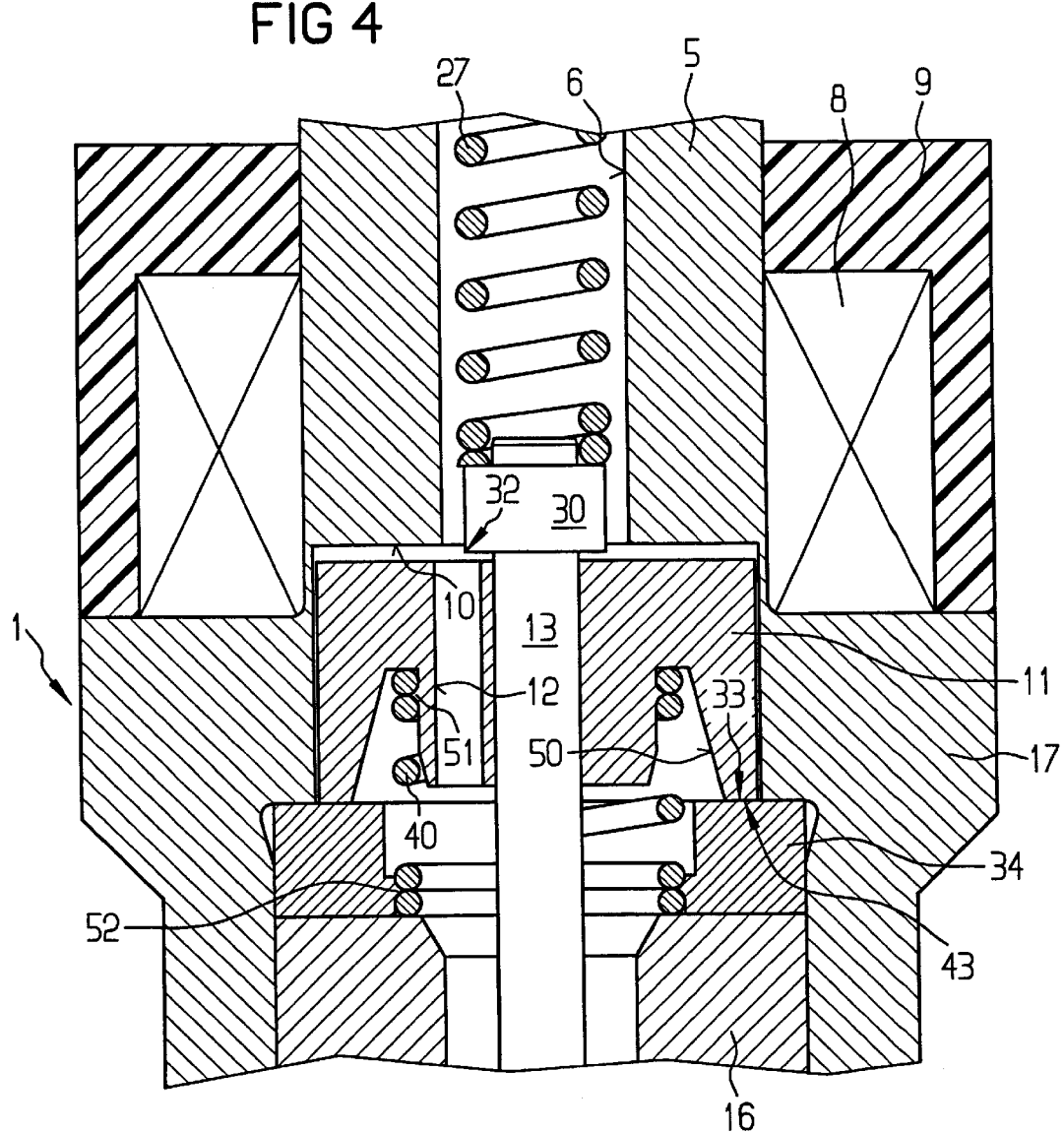
FIG. 4 shows a partial cross-sectional view of a second embodiment of a fuel injection valve according to the present invention.

For purposes of clarity, two exemplary embodiments of a fuel injection valve according to the present invention are described in greater detail with the help of FIGS. 2, 3 and 4. First, a conventional fuel injection valve and its essential components is briefly explained.

The fuel injection valve 1 has a fuel intake nozzle 2, which can be connected to a fuel line via thread 4 in a conventional manner. Fuel injection valve 1 is designed as an injection valve for fuel injection systems for compressed-mixture, spark-ignition internal combustion engines. Fuel injection valve 1 is particularly suitable for injecting fuel directly into a combustion chamber (not shown) of an internal combustion engine. The fuel passes via fuel filter 3 into longitudinal bore 6 in core 5. Core 5 has an outer thread section 7 which screws into fuel intake nozzle 2.

Downstream end 10 of core 5 is surrounded by a magnet coil 8, which is wound around coil insulating frame 9. Downstream from injection-side end 10 of core 5 there is an armature 11, which is separated from injection-side end 10 of core 5 by a small gap. Armature 11 has holes 12 through which the fuel passes. In addition, armature 12 is rigidly attached to valve needle 13, e.g., via welding. On the opposite end from armature 11, valve needle 13 has a valve closing element 14 which works in conjunction with valve seat 15, which is arranged on valve seat carrier 16. In the example shown in FIG. 1, valve seat carrier 16 is inserted into housing 17 and sealed via a sealing ring 18.

Housing 17 can be screwed into the cylinder head (not shown) of an internal combustion engine via thread 19. When fuel injection valve 1 opens, fuel is injected via at least one injection orifice 20 of the combustion chamber (not shown) of the internal combustion engine located on the downstream end of valve seat carrier 16. To improve fuel distribution, for example a plurality of spiral flutes 21 around the circumference of valve closing element 14 may be used. Seal 22 seals valve seat carrier 16 in the bore in the cylinder head. Valve needle 13 moves along guide surfaces 24 in longitudinal hole 23 in valve seat carrier 16. Flats 25 are provided between guide surfaces 24, to ensure that the fuel flows through freely.

To open fuel injection valve 1, magnet coil 8 is energized via an electrical energizing current, which is conveyed via electrical connecting cable 26. When fuel injection valve 1 is in its inoperative position, first return spring 27 acts upon armature 11 in the direction opposite to the lift so that valve closing element 14 is held in contact with valve seat 15 so as to form a seal. When magnet coil 8 is energized, armature 11 is pulled towards core 5 in the direction of lift, the lift being predefined by the gap between core 5 and armature 11 when in its inoperative position. Valve needle 13, which is rigidly attached to armature 11, and valve closing element 14 are carried along in the direction of lift, so that valve closing element 14 opens injection orifice 20.

When the energizing current is turned off, armature 11, valve needle 13, which is rigidly attached to armature 11, and valve closing element 14 are accelerated in the direction of closing, in the opposite direction to the lift. If valve closing element 14 impacts valve seat 15, valve closing element 14 may bounce off valve seat 15 due to the elasticity of valve needle 13 and the mass of armature 11, which is rigidly attached to valve needle 13. This is highly undesirable, as it causes fuel injection valve 1 to open again for a short time, which falsifies the metered time and the metered amount.

Figure 1:
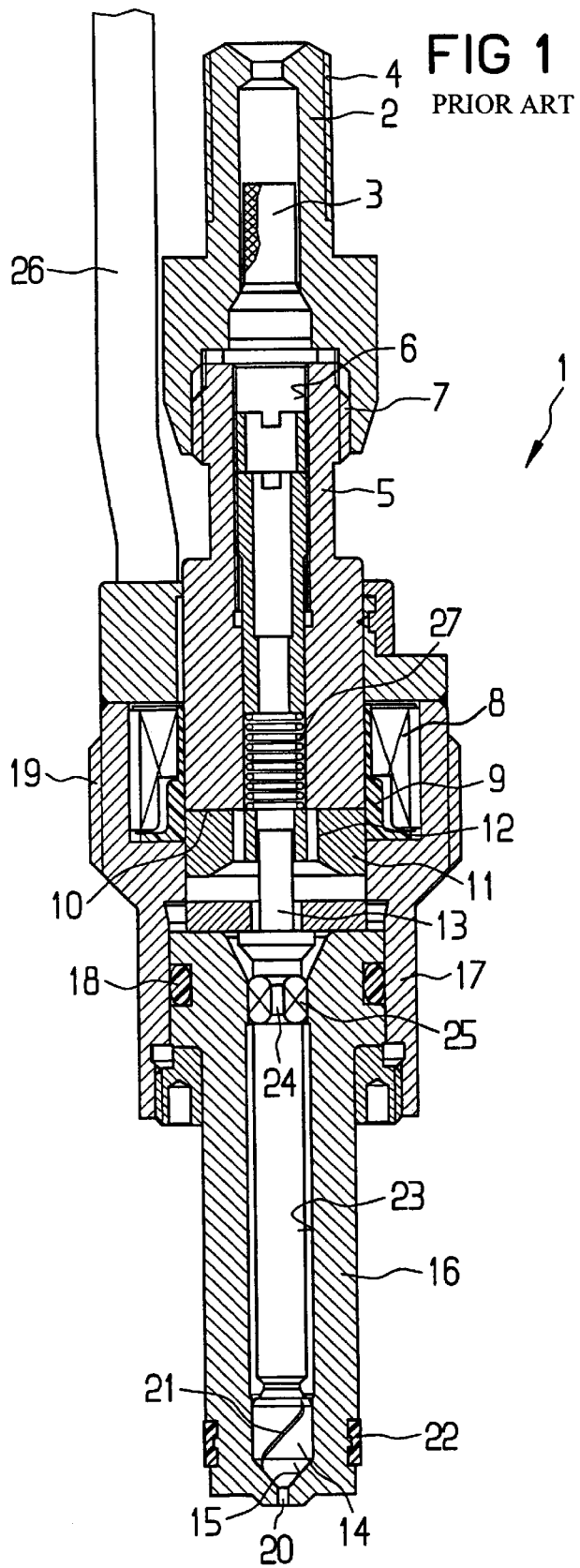
FIG. 1 shows a cross-sectional view of a conventional fuel injection valve.

When the conventional fuel injection valve 1 shown in FIG. 1 opens, the disadvantage is that the magnetic force applied by magnet coil 8 acts upon armature 11 and valve needle 13, which is rigidly attached to armature, immediately after the energizing current is turned on. This is undesirable insofar as the magnetic force applied by magnet coil 8 does not immediately reach its final value directly after the energizing current is actuated due to the self-induction of magnet coil 8 and the eddy currents induced by magnet coil 8. Thus in the initial phase of the opening lift, initially a reduced magnetic force is applied to armature 11, which results in an opening time that is too long for many applications.

The embodiment according to the present invention helps overcome these disadvantages. FIG. 2 shows a detail of a cross section through a first exemplary embodiment according to the present invention. Herein, we have only shown components that are essential to the present invention. The remaining components may be identical in design to those of a conventional fuel injection valve 1, particularly fuel injection valve 1 shown in FIG. 1. For purposes of clarity, in FIG. 2 we have used the same reference symbols for elements that were shown in FIG. 1. FIG. 3 is an enlargement of detail III shown in FIG. 2.

Valve needle 13 has a flange 30 at the opposite end to valve closing element 14; in the exemplary embodiment shown, this flange is in the form of stepped cylinder 37. According to the present invention, armature 11 is not rigidly attached to valve needle 13, but rather can be moved axially relative to valve needle 13 within certain preassigned boundaries. Valve needle 13 and flange 30 of valve needle 13 in the exemplary embodiment shown have a first stop surface 32 for armature 11. In the exemplary embodiment shown, first stop surface 32 is provided on first shoulder 31 of the flange, which is in the form of a stepped cylinder 37. A second stop surface 33 is provided on stop element 34, which in the exemplary embodiment is ring-shaped or in the shape of a partial ring, is stationary and mounted rigidly in the housing, and can be inserted into valve housing 17. Stop element 34 can, for example, lock into in place. In addition, it is possible to weld stop element 34 to housing 17. Valve housing 17 may have a stepped projection 36 to facilitate axial positioning of stop element 34. Herein, when inserted into valve housing 17 stop element 34 is pushed into valve housing 17 until it comes into contact with projection 36 of valve housing 17.

Flange 30, which is in the form of a stepped cylinder 37, and valve needle 13 may be a single piece, and may, for example, be manufactured together via pressure forming. Alternatively, flange 30 may be a separate component and may be attached to valve needle 13 via, for example, welding. The advantage of the latter method is that the axial position of flange 30 can be adjusted before it is finally attached to valve needle 13.

In FIGS. 2 and 3, the fuel injection valve is shown in its inoperative position, with no electrical current applied to magnet coil 8. As these Figures show, the distance between first stop surface 32 on flange 30 of valve needle 13 and second stationary stop surface 33 is dimensioned so that when fuel injection valve 1 is in its inoperative position there is a gap 39 between first stop surface 32 and face 38 of armature 11 opposite stop surface 32. In the inoperative state shown, armature 11 is held in contact with second stop surface 33 of stationary stop element 34 by second return spring 40. Second return spring 40 is inserted between second step 41 of flange 30, which is in the form of stepped cylinder 37, and face 38 of armature 11 opposite first stop surface 32. First return spring 27 rests against face 44 on the other side of second step 41 and acts upon valve needle 13 via flange 30 and pretensions valve needle 13 in the direction of closing. As FIG. 2 and FIG. 3 indicate, there is, between downstream end 10 of core 5 and upper face 38 of armature 11, a second gap 42 whose dimensions in the axial direction are greater than those of first gap 39 between first support surface 32 and face 38 of armature 11.

The fuel injection valve according to the present invention functions as follows:

When the fuel injection valve opens, after magnet coil 8 has been energized, initially only armature 11 is accelerated in the direction of lift against second return spring 40, initially without valve needle 13 and valve closing element 14, which is attached to the valve needle 13, being carried with it. Due to the preacceleration, armature 11 impacts first stop surface 32 with substantial impetus and carries valve needle 13 and valve closing element 14 with it. As a result of the preacceleration and the impetus of armature 11, the opening movement after armature 11 impacts first stop surface 32 is relatively brisk. In addition, the "flight time" before armature 11 impacts first stop surface 32 is advantageous in that provided the distance between first stop surface 32 and second stop surface 33 is correctly dimensioned, the delay time achieved is long enough to ensure that the magnetic force has in the meantime reached its full intensity. As we have already described, in the initial phase of energization of magnet coil 8, the magnetic force generated is reduced due to the self-induction of magnet coil 8 and induced eddy currents. Subsequently, acceleration of valve needle 13 and valve closing element 14 occurs in response to a full, non-reduced magnetic force, which also helps ensure the opening time is short. After reaching first stop surface 32, armature 11, along with the valve needle 13 and valve closing element 14, is accelerated in the direction of lift until face 38 of armature 11 reaches the downstream face of end 10 of core 5. Thus gap 39 determines the preacceleration of armature 11, while second gap 42 determines the opening lift of fuel injection valve 1.

When fuel injection valve 1 closes, initially armature 11, valve needle 13 and valve closing element 14 move synchronously in the direction of closing. As soon as valve closing element 14 reaches valve seat 15, the movement of valve closing element 14 and valve needle 13 ends abruptly, while armature 11 continues to move in the direction of closing until armature 11 impacts second stop surface 33. Even if armature 11 bounces back from second stop surface 33, this has no detrimental effect on the opening behavior of fuel injection valve 1, as second return spring 40 keeps armature 11 from reaching first stop surface 32 again. This keeps valve needle 13 and valve closing element 14 from being carried along. Finally, armature 11 is held in contact with second stop surface 33 by second return spring 40 until a new current pulse energizes magnet coil 8, causing fuel injection valve 1 to open.

As a result of the measures according to the present invention, one that bounce is successfully eliminated and that the opening time of fuel injection valve 1 is relatively short.

During the closing movement, additional dampening of armature 11 occurs, because the space that opens up between second stop surface 33 and face 43 opposite second stop surface 33 during opening is connected to a fuel channel leading from fuel intake nozzle 2 to valve closing element 14 and fills up with fuel when fuel injection valve 1 opens. Thus during the closing movement a pressure flow arises between flat second stop surface 33 and flat face 43 of armature 11 opposite it and ensures that armature 11 comes to rest on second surface 33 without bouncing.

As the "flight time" of armature 11 until it reaches first stop surface 32 is constant because armature 11 always rests on first stop surface 33 when in its inoperative position due to second return spring 40, when controlling fuel injection valve 1 according to the present invention, one simply needs to ensure that the current pulse that opens the valve is turned on in advance to the start of the metering time by the amount of this "flight time." No further measures are required in the electrical control device that controls magnet coil 8 to compensate electrically for the smaller magnetic force at the start of the electrical control pulse, which means the electrical control device is less expensive to manufacture.

FIG. 4 shows a second exemplary embodiment of fuel injection valve 1 according to the present invention. For purposes of clarity, assigned elements already described have the same reference numbers.

By contrast with the exemplary embodiment described with the help of FIGS. 2 and 3, in the second exemplary embodiment shown in FIG. 4 second return spring 40 is under tractive force and is integrated into ring-shaped recess 50 in armature 11 on the opposite side from core 5. Second return spring 40 is attached to armature 11 via first holder 51, which is formed, for example, by caulking, and to stop element 34, which is mounted in the housing and is stationary, via a further holder 52, which is also formed, for example, by caulking. Return spring 40 is under tractive pre-stress, so that in the inoperative position shown in FIG. 4 armature 11 is held in contact with second stop surface 33. The movement sequence is essentially the same as with the first exemplary embodiment described with the help of FIGS. 2 and 3, armature 11 being constantly pulled downwards in the direction of second stop surface 33 by second return spring 40, as shown in FIG. 4. In this exemplary embodiment too, during the closing movement this keeps armature 11 from bouncing back from second stop surface 33 so far that it reaches stop surface 32 again thereby opening fuel injection valve 1 again.

In conclusion, fuel injection valve 1 can also be operated so that before current is actually applied to magnet coil 8 a smaller current can be preapplied so as to cause premagnetization. During premagnetization, armature 11 is pulled against the force of second return spring 40 as far as first stop surface 32, without the force of first return spring 27 being overcome. Subsequently, when the energizing current of magnet coil 8 is increased, the fuel injection valve opens. As a result of this type of operation, the point in time at which fuel injection valve 1 opens may be precisely specified; however, the above advantages associated with the preacceleration of armature 11 which ensure a short opening time is lossed.

What is claimed is:

1. A fuel injection valve for a fuel injection system of an internal combustion engine, comprising:

a magnet coil;

a first return spring;

an armature movable by the magnet coil in a first direction of lift against the first return spring;

a valve needle including a first stop surface for the armature;

a valve closing element connected to the valve needle;

a stationary second stop surface; and a second return spring acting upon the armature in a second direction, the second return spring holding the armature in contact with the second stop surface in an inoperative position when the magnet coil is not energized so that a distance between the armature and the first stop surface is predefined, the second direction being opposite to the first direction.

2. The valve according to claim 1, further comprising:

a stationary valve housing, the second stop surface being situated on the stationary valve housing.

3. The valve according to claim 1, further comprising:

a valve seat operating in conjunction with the valve closing element; and a stationary valve seat carrier surrounding the valve needle, the stationary valve seat carrier bearing the valve seat, the second stop surface being situated on the stationary valve seat carrier.

4. The valve according to claim 1, further comprising:

a flange situated on the valve needle, the first stop surface being situated on the flange.

5. The valve according to claim 4, wherein the second return spring is situated between the armature and the flange.

6. The valve according to claim 5, wherein the flange is a stepped cylinder, the stepped cylinder including a first shoulder and a second step, the first shoulder forming the first stop surface, the second return spring resting against the second step.

7. The valve according to claim 6, wherein the stepped cylinder further includes a face that faces away from the second return spring, the first return spring resting against the face.

8. The valve according to claim 1, wherein the armature has a ring-shaped recess, the second return spring being situated in the ring-shaped recess.

9. The valve according to claim 8, wherein:

the ring-shaped recess is situated on a side of the armature opposite the first stop surface, and the second return spring is pretensioned in a direction of traction.

10. The valve according to claim 1, further comprising:

a fuel intake nozzle, the armature having a face opposite the second stop surface and a space, the face and the second stop surface being flat, the space being adjacent to a fuel channel extending from the fuel intake nozzle to the valve closing element, the space opening between the armature and the second stop surface after the armature is lifted off the second stop surface.

11. The valve according to claim 1, wherein the predefined distance is dimensioned so that a substantially constant magnetic force is generated during a flight time required for the armature to move away from the second stop surface and impact the first stop surface when the magnet coil is energized, the magnetic force being applied by the magnet coil.

* * * * *